US012800742B2

(12) United States Patent
Li

(10) Patent No.: US 12,800,742 B2
(45) Date of Patent: Nov. 17, 2026

(54) RADAR DETECTION METHOD AND RELATED APPARATUS

(71) Applicant: Yinwang Intelligent Technologies Co., Ltd., Shenzhen (CN)

(72) Inventor: Qiang Li, Beijing (CN)

(73) Assignee: YINWANG INTELLIGENT TECHNOLOGIES CO., LTD., Shenzhen (CN)

(*) Notice: Subject to any disclaimer, the term of this patent is extended or adjusted under 35 U.S.C. 154(b) by 902 days.

(21) Appl. No.: 18/189,703

(22) Filed: Mar. 24, 2023

(65) Prior Publication Data

US 2023/0228862 A1 Jul. 20, 2023

Related U.S. Application Data

(63) Continuation of application No. PCT/CN2020/118164, filed on Sep. 27, 2020.

(51) Int. Cl.
*G01S 13/34* (2006.01)
*G01S 7/41* (2006.01)

(52) U.S. Cl.
CPC ............ *G01S 13/341* (2013.01); *G01S 7/414* (2013.01)

(58) Field of Classification Search
CPC .... G01S 13/341; G01S 13/343; G01S 13/345; G01S 13/584; G01S 17/34; G01S 17/58; G01S 17/931; G01S 7/038; G01S 7/2883; G01S 7/292; G01S 7/295; G01S 7/354; G01S 7/356; G01S 7/414; G01S 7/4876; G01S 7/4917; G01S 7/493
See application file for complete search history.

(56) References Cited

U.S. PATENT DOCUMENTS

| | | | | |
|---|---|---|---|---|
| 4,201,986 A * | 5/1980 | Ducrocq | G01S 13/343 | 342/100 |
| 7,023,376 B1 * | 4/2006 | Kuroda | G01S 13/348 | 342/195 |
| 8,436,766 B1 * | 5/2013 | Nunn | G01S 7/2921 | 342/159 |
| 11,016,171 B2 * | 5/2021 | Melzer | G01S 7/354 | |
| 11,209,523 B2 * | 12/2021 | Meissner | G01S 13/53 | |
| 11,635,510 B1 * | 4/2023 | Chartrand | G06T 5/70 | 342/25 C |
| 2008/0122684 A1 * | 5/2008 | Nakahama | G01S 7/038 | 342/195 |
| 2009/0096661 A1 * | 4/2009 | Sakamoto | G01S 13/345 | 342/92 |

(Continued)

FOREIGN PATENT DOCUMENTS

| | | |
|---|---|---|
| CN | 104635231 A | 5/2015 |
| KR | 101505044 B1 | 3/2015 |

*Primary Examiner* — Peter M Bythrow
(74) *Attorney, Agent, or Firm* — Conley Rose, P.C.

(57) ABSTRACT

A radar ranging method includes: obtaining a first signal, where the first signal is a frequency domain signal obtained after low frequency suppression is performed in a beat frequency signal, and the beat frequency signal is a signal obtained by mixing a transmitted signal transmitted by a frequency modulated continuous wave FMCW radar and a received echo signal; performing mean gradient calculation on the first signal in frequency domain to obtain a second signal; and calculating at least one of a speed or a distance of a target object based on a peak signal in the second signal.

20 Claims, 8 Drawing Sheets

(56) References Cited

U.S. PATENT DOCUMENTS

| | | | | |
|---|---|---|---|---|
| 2010/0073216 | A1* | 3/2010 | Sakamoto | G01S 3/74 342/146 |
| 2015/0007653 | A1* | 1/2015 | Fehrenbach | G01F 1/002 73/198 |
| 2016/0373125 | A1* | 12/2016 | Pagnanelli | H03M 3/436 |
| 2018/0070253 | A1* | 3/2018 | Kleinbeck | H04W 24/08 |
| 2018/0211179 | A1* | 7/2018 | Dzierwa | H04B 17/391 |
| 2018/0356511 | A1* | 12/2018 | Buddendick | G01S 13/584 |
| 2019/0072601 | A1* | 3/2019 | Dzierwa | H04B 17/30 |
| 2019/0113600 | A1* | 4/2019 | Melzer | G01S 13/343 |
| 2019/0120953 | A1* | 4/2019 | Takayama | G01S 13/345 |
| 2019/0208112 | A1* | 7/2019 | Kleinbeck | G01S 5/0221 |
| 2019/0242972 | A1* | 8/2019 | Melzer | G01S 13/931 |
| 2019/0353751 | A1* | 11/2019 | Raphaeli | G01S 7/292 |
| 2019/0377089 | A1* | 12/2019 | Rohner | G01S 7/4911 |
| 2020/0124699 | A1* | 4/2020 | Meissner | G01S 13/0209 |
| 2020/0150260 | A1* | 5/2020 | Lang | G01S 13/42 |
| 2020/0191911 | A1* | 6/2020 | Meissner | G01S 13/343 |
| 2020/0341109 | A1* | 10/2020 | Meissner | G01S 13/02 |
| 2021/0364626 | A1* | 11/2021 | Schoor | G01S 7/354 |
| 2022/0057487 | A1* | 2/2022 | Khairmode | G01S 13/931 |
| 2022/0365169 | A1* | 11/2022 | Lefevre | G01S 7/35 |
| 2024/0004055 | A1* | 1/2024 | Ott | G01S 7/417 |
| 2024/0230836 | A9* | 7/2024 | Kavousi Ghafi | G01S 13/89 |

* cited by examiner

RADAR DETECTION METHOD AND RELATED APPARATUS

CROSS-REFERENCE TO RELATED APPLICATIONS

This application is a continuation of International Patent Application No. PCT/CN2020/118164 filed on Sep. 27, 2020, the disclosure of which is hereby incorporated by reference in its entirety.

TECHNICAL FIELD

The present disclosure relates to the field of radar technologies, and in particular, to a radar detection method and a related apparatus.

BACKGROUND

A frequency modulated continuous wave (FMCW) radar is a ranging device, and the FMCW radar has different subdivided types. For example, a frequency modulated continuous wave radar using radio waves is referred to as FMCW RADAR. For another example, a frequency modulated continuous wave radar using laser light is referred to as FMCW LIDAR. An FMCW radar of any type includes a structure shown in FIG. 1. In FIG. 1, the radar generates a radio frequency or laser signal on which frequency modulation is performed, and divides the generated frequency modulated signal into two channels. One channel is used as a local reference signal (also referred to as a local oscillator signal), and the other channel is emitted to a detected target object (also referred to as a reflector) and reflected by a surface of the target object to form an echo signal.

FIG. 2 shows a process of processing a reference signal and an echo signal by an FMCW radar. As shown in (a) in FIG. 2, a thick line indicates that a frequency of the frequency modulated signal of a transmitted signal and the reference signal changes over time. In the first half of time, the signal frequency increases from low to high over time, and in the second half of the time, the signal frequency decreases from high to low over time. A thin line indicates the echo signal. A beat frequency signal may be output after the echo signal and the reference signal passing through a frequency mixer. A frequency of the beat frequency signal is a frequency difference between the reference signal frequency and the echo signal frequency, as shown in (b) in FIG. 2. In an ideal condition, the beat frequency signal has a fixed frequency (as shown by a part between dashed-lines in the figure). As shown in (c) in FIG. 2, the frequency of the beat frequency signal may be detected by performing frequency domain analysis (usually fast Fourier transform (FFT)) on the beat frequency signal. The frequency is in a one-to-one correspondence with a distance and a speed of the target object. Therefore, speed and distance information of the target object may be calculated based on the frequency of the beat frequency signal.

In the FMCW radar, the frequency of the beat frequency signal is proportional to the distance of the target object (also referred to as a reflector). A long-distance object corresponds to a higher beat frequency, and a short-distance object forms a lower beat frequency. A common problem in the FMCW radar is low frequency crosstalk. As shown in FIG. 3, the low frequency crosstalk is generally caused by energy leakage of an optical device, and a low frequency is formed with a reference signal (also referred to as a local oscillator signal) to form a beat frequency signal. Alternatively, reflected light of an optical device such as a lens and a reference signal (also referred to as a local oscillator signal) form a low frequency beat frequency signal. Energy of low frequency interference tends to far exceed energy of an actual echo signal. As shown in FIG. 4, in a relatively low frequency part, energy of a signal far exceeds that of a high frequency part. This brings great difficulties to detection of an actual signal. Currently, crosstalk is generally avoided in a hardware isolation manner, for example, an optical path for isolating a signal transmitted by the FMCW radar and an optical path for isolating a signal received by the FMCW radar. However, isolation achieved by hardware is limited, and interference still exists. In addition, ensuring relatively high isolation significantly increases hardware costs.

SUMMARY

Embodiments of the present disclosure disclose a radar ranging method and a related apparatus, to improve accuracy of a radar detection result and reduce implementation costs.

According to a first aspect, an embodiment of the present disclosure provides a radar ranging method. The method includes: obtaining a first signal, where the first signal is a frequency domain signal obtained after low frequency suppression is performed in a beat frequency signal, and the beat frequency signal is a signal obtained by mixing a transmitted signal transmitted by a frequency modulated continuous wave FMCW radar and a received echo signal; performing mean gradient calculation on the first signal in frequency domain to obtain a second signal, where the mean gradient calculation is used to highlight a difference between a signal value of each sampling point in the first signal and a signal value of a surrounding sampling point; and calculating at least one of a speed or a distance of a target object based on a peak signal in the second signal.

In the foregoing method, low frequency suppression is performed on the frequency domain signal of the beat frequency signal, so as to reduce influence of low frequency interference on subsequent calculation of the speed or distance of the target object. To prevent a peak signal that may exist in the low frequency part from being clipped due to low frequency suppression, the peak signal that may exist in the low frequency part is further highlighted by performing mean gradient calculation. Therefore, accuracy of a radar detection result calculated by using the solution in this embodiment of the present disclosure is relatively high. In addition, implementation of this embodiment of the present disclosure is completed by performing special processing on a signal, and a hardware structure of a radar does not need to be improved. Therefore, implementation costs are relatively low.

With reference to the first aspect, in a possible implementation of the first aspect, the obtaining a first signal includes: performing low frequency suppression on the beat frequency signal to obtain a first transition signal; and performing FFT or short-time Fourier transform (STFT) on the first transition signal to obtain the first signal.

With reference to the first aspect or any one of the foregoing possible implementations of the first aspect, in still another possible implementation of the first aspect, the obtaining a first signal includes: performing FFT or STFT on the beat frequency signal to obtain a second transition signal; and performing low frequency suppression on the second transition signal to obtain the first signal.

With reference to the first aspect or any one of the foregoing possible implementations of the first aspect, in still another possible implementation of the first aspect, the low frequency suppression is implemented by using a digital tap filter, or the low frequency suppression is implemented by performing scaling processing on a preset sequence parameter.

With reference to the first aspect or any one of the foregoing possible implementations of the first aspect, in still another possible implementation of the first aspect, the performing mean gradient calculation on the first signal in frequency domain to obtain a second signal includes: perform, in frequency domain, a target operation on a signal of each sampling point in a plurality of sampling points in the first signal, to obtain a sub-signal that is in the second signal and that corresponds to each sampling point, where the target operation includes: performing a difference operation between a signal value of each sampling point and a reference value to obtain a sub-signal of each sampling point, where the reference value is an average value obtained through calculation based on signal values of at least two other sampling points than the sampling point.

With reference to the first aspect or any one of the foregoing possible implementations of the first aspect, in still another possible implementation of the first aspect, in frequency domain, a spacing between the at least two other sampling points and the sampling point is greater than a first preset threshold and less than a second preset threshold.

With reference to the first aspect or any one of the foregoing possible implementations of the first aspect, in still another possible implementation of the first aspect, the sub-signal ΔS(k) of each sampling point is as follows:

$$\Delta S(k) = S(k) - \left(\sum_{n=1}^{l_w} (S(k - l_p - n) + S(k + l_p + n))\right) \Big/ (2l_w),$$

where S(k) is a signal value of each sampling point, $S(k-l_p-n)$ is a signal value of another sampling point that has a frequency less than that of each sampling point in frequency domain and that is separated from each sampling point by $(l_p+n)$ sampling points, $S(k+l_p+n)$ is a signal value of another sampling point that has a frequency greater than that of each sampling point in frequency domain and that is separated from each sampling point by $(l_p+n)$ sampling points, $l_p$ is the first preset threshold, and $l_w$ is the second preset threshold.

According to a second aspect, an embodiment of the present disclosure provides a signal processing apparatus. The apparatus includes: an obtaining unit configured to obtain a first signal, where the first signal is a frequency domain signal obtained after low frequency suppression is performed in a beat frequency signal, and the beat frequency signal is a signal obtained by mixing a transmitted signal transmitted by a frequency modulated continuous wave FMCW radar and a received echo signal; an optimization unit configured to perform mean gradient calculation on the first signal in frequency domain to obtain a second signal, where the mean gradient calculation is used to highlight a difference between a signal value of each sampling point in the first signal and a signal value of a surrounding sampling point; and a calculation unit configured to calculate at least one of a speed or a distance of a target object based on a peak signal in the second signal.

In the foregoing apparatus, low frequency suppression is performed on the frequency domain signal of the beat frequency signal, so as to reduce influence of low frequency interference on subsequent calculation of the speed or distance of the target object. To prevent a peak signal that may exist in the low frequency part from being clipped due to low frequency suppression, the peak signal that may exist in the low frequency part is further highlighted by performing mean gradient calculation. Therefore, accuracy of a radar detection result calculated by using the solution in this embodiment of the present disclosure is relatively high. In addition, implementation of this embodiment of the present disclosure is completed by performing special processing on a signal, and a hardware structure of a radar does not need to be improved. Therefore, implementation costs are relatively low.

With reference to the second aspect, in a possible implementation of the second aspect, in terms of obtaining the first signal, the obtaining unit is further configured to: perform low frequency suppression on the beat frequency signal to obtain a first transition signal; and perform FFT or STFT on the first transition signal to obtain the first signal.

With reference to the second aspect or any one of the foregoing possible implementations of the second aspect, in still another possible implementation of the second aspect, in terms of obtaining the first signal, the obtaining unit is further configured to: perform FFT or STFT on the beat frequency signal to obtain a second transition signal; and perform low frequency suppression on the second transition signal to obtain the first signal.

With reference to the second aspect or any one of the foregoing possible implementations of the second aspect, in still another possible implementation of the second aspect, the low frequency suppression is implemented by using a digital tap filter, or the low frequency suppression is implemented by performing scaling processing on a preset sequence parameter.

With reference to the second aspect or any one of the foregoing possible implementations of the second aspect, in still another possible implementation of the second aspect, when mean gradient calculation is performed on the first signal in frequency domain to obtain a second signal, the calculation unit is further configured to: perform, in frequency domain, a target operation on a signal of each sampling point in a plurality of sampling points in the first signal, to obtain a sub-signal that is in the second signal and that corresponds to each sampling point, where the target operation includes: performing a difference operation between a signal value of each sampling point and a reference value to obtain a sub-signal of each sampling point, where the reference value is an average value obtained through calculation based on signal values of at least two other sampling points than the sampling point.

With reference to the second aspect or any one of the foregoing possible implementations of the second aspect, in still another possible implementation of the second aspect, in frequency domain, a spacing between the at least two other sampling points and the sampling point is greater than a first preset threshold and less than a second preset threshold.

With reference to the second aspect or any one of the foregoing possible implementations of the second aspect, in still another possible implementation of the second aspect, the sub-signal ΔS(k) of each sampling point is as follows:

$$\Delta S(k) = S(k) - \left(\sum_{n=1}^{l_w} (S(k - l_p - n) + S(k + l_p + n))\right) \Big/ (2l_w),$$

where S(k) is a signal value of each sampling point, $S(k-l_p-n)$ is a signal value of another sampling point that has a frequency less than that of each sampling point in frequency domain and that is separated from each sampling point by ($l_p$+n) sampling points, S(k+$l_p$+n) is a signal value of another sampling point that has a frequency greater than that of each sampling point in frequency domain and that is separated from each sampling point by ($l_p$+n) sampling points, $l_p$ is the first preset threshold, and $l_w$ is the second preset threshold.

According to a third aspect, an embodiment of the present disclosure provides a radar system. The radar system includes a memory and a processor. The memory is configured to store a computer program, and the processor is configured to invoke the computer program to implement the method described in any one of the first aspect or the possible implementations of the first aspect.

According to a fourth aspect, an embodiment of the present disclosure provides a computer-readable storage medium. The computer-readable storage medium stores a computer program; and when the computer program is run on a processor, the method according to any one of the first aspect or the possible implementations of the first aspect is implemented.

BRIEF DESCRIPTION OF DRAWINGS

The following describes the accompanying drawings used in embodiments of the present disclosure.

DESCRIPTION OF EMBODIMENTS

The following describes embodiments of the present disclosure with reference to the accompanying drawings in the embodiments of the present disclosure.

A lidar in this embodiment of the present disclosure can be applied to various fields such as intelligent transportation, autonomous driving, atmospheric environment monitoring, geographic surveying and mapping, and unmanned aerial vehicle, and can complete functions such as distance measurement, speed measurement, target tracking, and imaging recognition.

Figure 5:
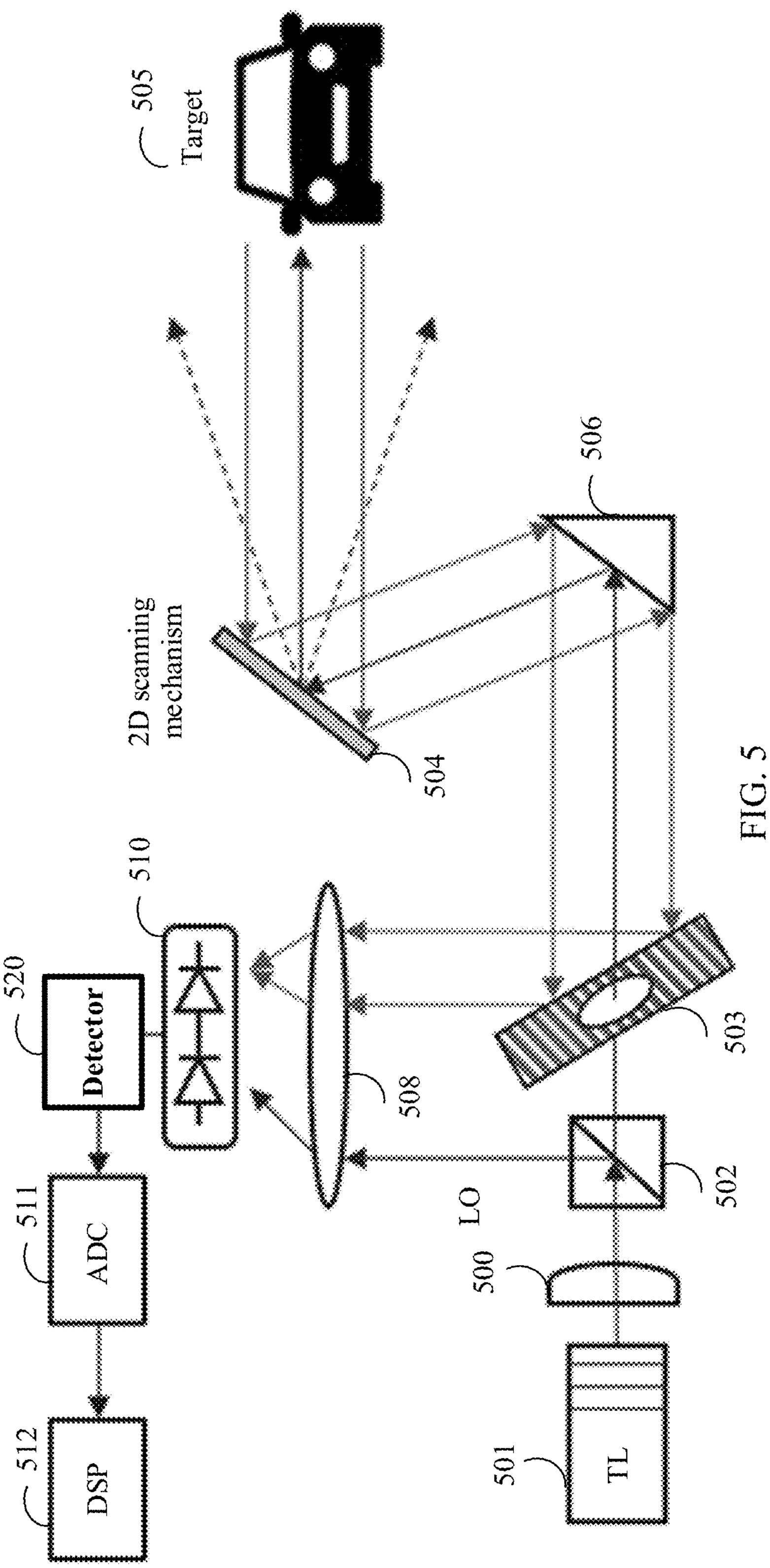
FIG. 5 is a schematic diagram of an architecture of a lidar system according to an embodiment of the present disclosure.

FIG. 5 is a schematic diagram of a structure of a lidar system according to an embodiment of the present disclosure. The lidar system is configured to detect information about a target object 505, and the lidar system includes: a laser 501, which may be, for example, a tunable laser (TL), and is configured to generate a laser signal, where the laser signal may be a linear frequency modulated laser signal, and a modulated waveform of a frequency of the laser signal may be a saw wave, a triangular wave, or a waveform in another form; a splitter 502 configured to split a laser light generated by the laser 501, to obtain a transmitted signal and a local oscillator signal (LO), where the local oscillator signal is also referred to as a reference signal, and optionally, a collimating lens 500 may be further disposed between the laser 501 and the splitter, and the lens 500 is configured to perform beam shaping on a laser signal transmitted to the splitter 502; a collimator 503 configured to couple the transmitted signal into a scanner 504 with maximum efficiency; the scanner 504, also referred to as a 2D scanning mechanism configured to transmit the transmitted signal at a specific angle, where after the transmitted signal is transmitted, the transmitted signal is reflected back by the target object 505 to form an echo signal, the scanner 504, in this case, is further configured to receive the echo signal, and after passing through a corresponding optical device (for example, a mirror reflector 506 (optional) and a receiving lens 508 (optional)), the echo signal converges with the local oscillator signal at a frequency mixer 510; the frequency mixer 510 configured to perform frequency mixing processing on the local oscillator signal and the echo signal to obtain a beat frequency signal; a detector 520 configured to extract the beat frequency signal from the frequency mixer, where the detector 520 may be, for example, a balanced photo detector (BPD); an analog to digital converter (ADC) 511 configured to sample the beat frequency signal, where the sampling is essentially a process of converting an analog signal into a digital signal; and a processor 512, where the processor may include a device having a computing capability, such as a digital signal processor (DSP), a central processing unit (CPU), an accelerated processing unit (APU), a graphic processing unit (GPU), a microprocessor, or a microcontroller, the accompanying figure uses a DSP as an example for description, and the processor is configured to process the beat frequency signal obtained by sampling, to obtain information such as a speed and a distance of the target object.

In this embodiment of the present disclosure, the target object 505 is also referred to as a reflector. The target object 505 may be any object in a scanning direction of the scanner 504, for example, may be a person, a mountain, a vehicle, a tree, or a bridge. FIG. 5 uses a vehicle as an example for illustration.

In this embodiment of the present disclosure, an operation of processing a beat frequency signal obtained by sampling to obtain information such as a speed and a distance of the target object may be completed by one or more processors 512, for example, by one or more DSPs, or may be completed by one or more processors 512 in combination with another component, for example, a DSP in combination with one or more central processing units CPUs. When processing the beat frequency signal, the processor 512 may specifically invoke a computer program stored in a computer-readable storage medium. The computer-readable storage medium includes but is not limited to a random-access memory (RAM), a read-only memory (ROM), an erasable programmable read-only memory (EPROM) or a compact disc read-only memory (CD-ROM). The computer-readable storage medium may be disposed on the processor 512, or may be independent of the processor 512.

In this embodiment of the present disclosure, there may be one or more components mentioned above. For example, there may be one or more lasers 501. When there is one laser 501, the laser 501 may alternately transmit a laser signal with a positive slope and a laser signal with a negative slope in time domain. When there are two lasers 501, one laser 501 transmits a laser signal with a positive slope, and the other laser 501 transmits a laser signal with a negative slope, and the two lasers 501 may synchronously transmit laser signals.

Figure 6:
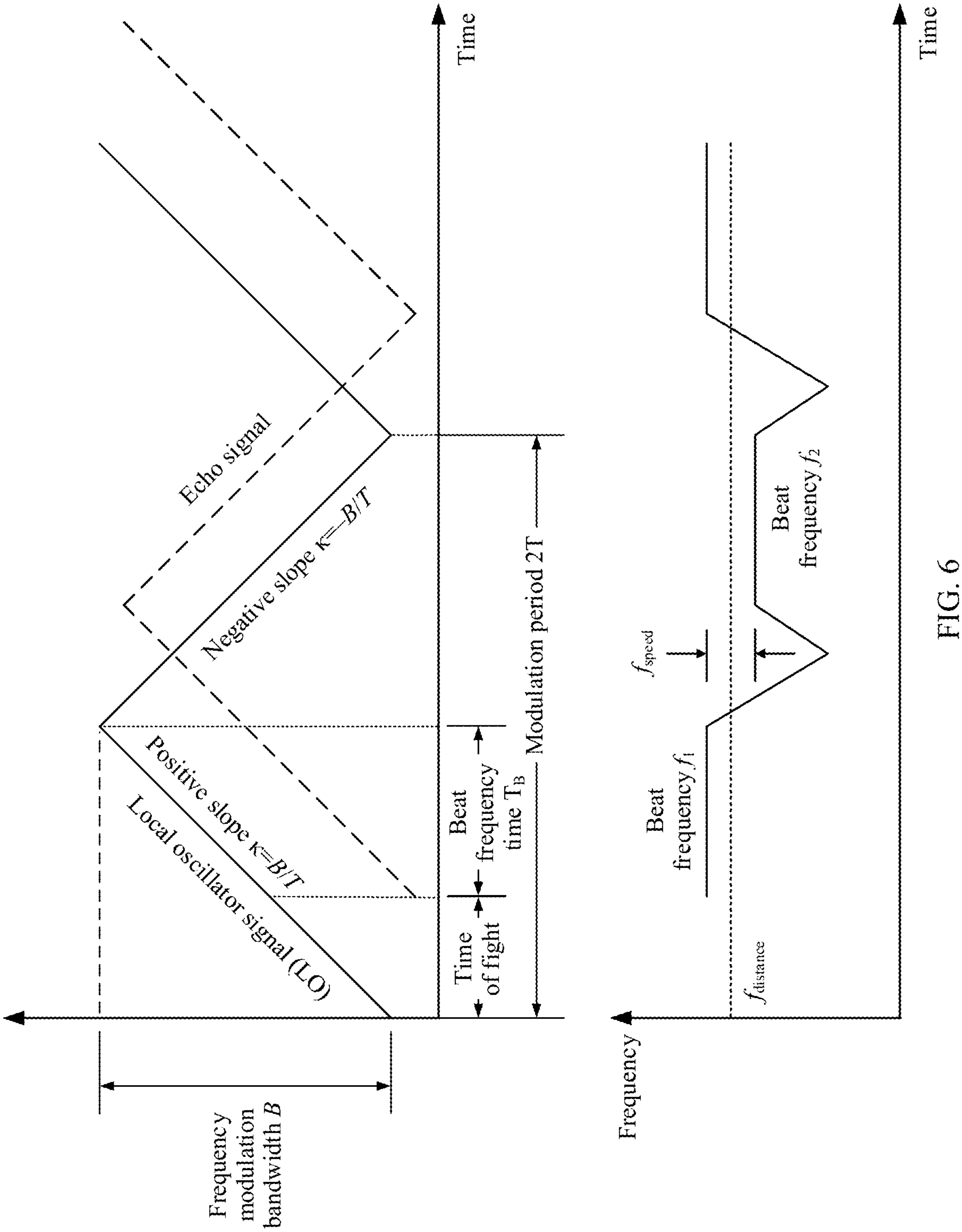
FIG. 6 is a schematic diagram of a beat frequency signal generated by a triangular wave according to an embodiment of the present disclosure.

As shown in FIG. 6, for example, a modulation waveform of a frequency of the laser signal is triangular wave linear frequency modulation. After a period of time of flight, an echo signal is mixed with a local oscillator signal LO. This period of time of flight is a time from a moment at which a transmitted signal divided from the laser signal starts to be emitted to a moment at which the echo signal returns. After the time of flight, a beat frequency signal generated by the echo signal and the local oscillator signal is constant in a period of time, can accurately reflect information about a distance and a speed of the target object. This period of time is a beat frequency time. The beat frequency signal needs to include a beat frequency $f_1$ corresponding to a positive slope and a beat frequency $f_2$ corresponding to a negative slope, a spectrum $f_{speed}$ related to the speed of the target object may be represented as $f_{speed}=(f_1-f_2)/2$, and a frequency $f_{distance}$ related to the distance of the target object may be represented as $f_{distance}=(f_1+f_2)/2$. After $f_{speed}$ and $f_{distance}$ are obtained, the distance of the target object (to the lidar) and the moving speed of the target object may be calculated.

Figure 7:
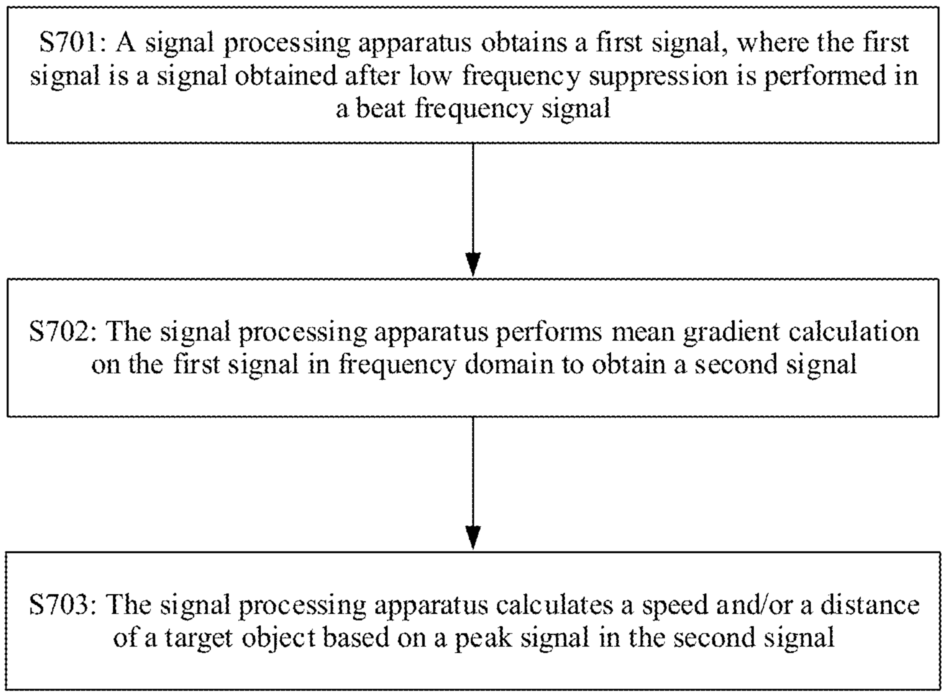
FIG. 7 is a schematic flowchart of a radar detection method according to an embodiment of the present disclosure.

FIG. 7 shows a radar detection method according to an embodiment of the present disclosure. The method may be implemented based on components in the lidar system shown in FIG. 5. Some operations in subsequent descriptions are completed by a signal processing apparatus, and the signal processing apparatus may be the foregoing processor 512, or an apparatus in which the foregoing processor 512 is deployed. For example, a lidar system in which the foregoing processor 512 is deployed or a module in the lidar system. The method includes but is not limited to the following steps.

Step S701: A signal processing apparatus obtains a first signal.

In an embodiment, the first signal is a frequency domain signal obtained after low frequency suppression is performed in a beat frequency signal, and the beat frequency signal is a signal obtained by mixing a signal transmitted by a frequency modulated continuous wave FMCW radar and a received echo signal.

The low frequency suppression is to suppress energy of a low frequency part in a signal (that is, weaken the energy of the low frequency part). There are many specific implementation manners to implement the low frequency suppression. For example, the low frequency suppression may be implemented by using a digital tap filter. For another example, the low frequency suppression may be implemented by performing scaling processing on a preset sequence parameter. A specific implementation is not limited in the present disclosure.

Figure 8:
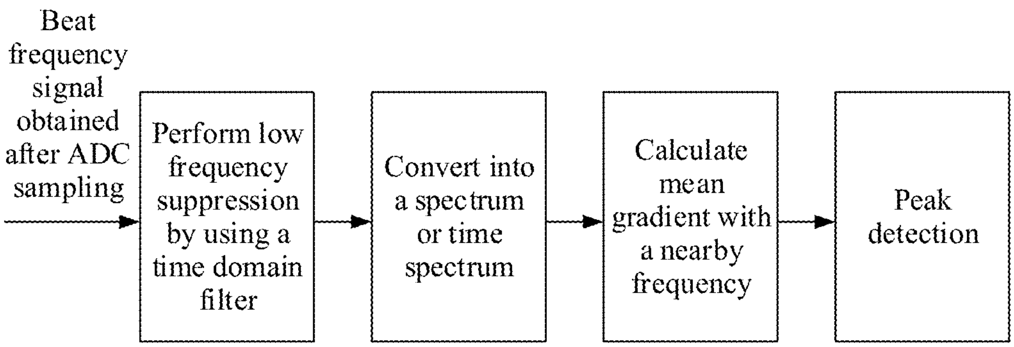
FIG. 8 is a schematic flowchart of another radar detection method according to an embodiment of the present disclosure.

In a manner, as shown in FIG. 8, the obtaining a first signal may specifically include the following operations.

Figure 9:
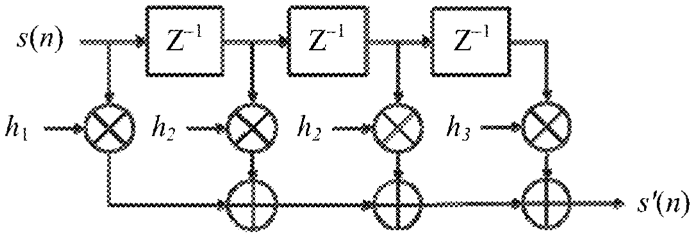
FIG. 9 is a schematic diagram of a working principle of a digital tap filter according to an embodiment of the present disclosure.

First, low frequency suppression is performed on the beat frequency signal to obtain a first transition signal. For example, a digital tap filter is used to suppress a low frequency component of a beat frequency signal. A working principle of the digital tap filter when the digital tap filter suppresses a low frequency is shown in FIG. 9. The digital tap filter includes a delayer $Z^{-1}$, a multiplier ⊗, and an adder⊕. It is assumed that a filtering coefficient of the digital tap filter is $[h_1, h_2, \ldots, h_N]$, where N is an order of the digital tap filter (FIG. 9 uses an example in which N is equal to 3), and a first transition signal s'(n) may be obtained by using formula 1-1.

$$s'(n) = \sum_{i=1}^{N} s(n-i) * h_i \quad 1\text{-}1$$

In formula 1-1, s(n) is an input beat frequency signal, and a low frequency part of the beat frequency signal s(n) may be suppressed by selecting the filtering coefficient $[h_1, h_2, \ldots, h_N]$ of the digital tap filter. Therefore, energy of the low frequency part of the obtained first transition signal s'(n) is relatively low.

Then, FFT or STFT is performed on the first transition signal to obtain the first signal.

Optionally, the first transition signal may be converted into a frequency domain signal by using FFT, and the frequency domain signal is the first signal. An expression of the FFT is shown in formula 1-2:

$$S(k)=F(s'(n)) \quad 1\text{-}2$$

In formula 1-2, F( ) represents Fourier transform, and S(k) is a frequency signal obtained after FFT is performed on the first transition signal s'(n), that is, the first signal described above.

Optionally, the first transition signal may be converted into a time-frequency two-dimensional signal by using STFT (STFT), and the time-frequency two-dimensional signal is the first signal. An expression of the STFT (STFT) is shown in formula 1-3:

$$S(k)=\mathrm{STFT}(s'(n)) \quad 1\text{-}3$$

In formula 1-3, STFT( ) represents STFT, and S(k) is a time-frequency two-dimensional spectrum obtained after STFT is performed on the first transition signal s'(n), that is, the first signal described above.

Figure 10:
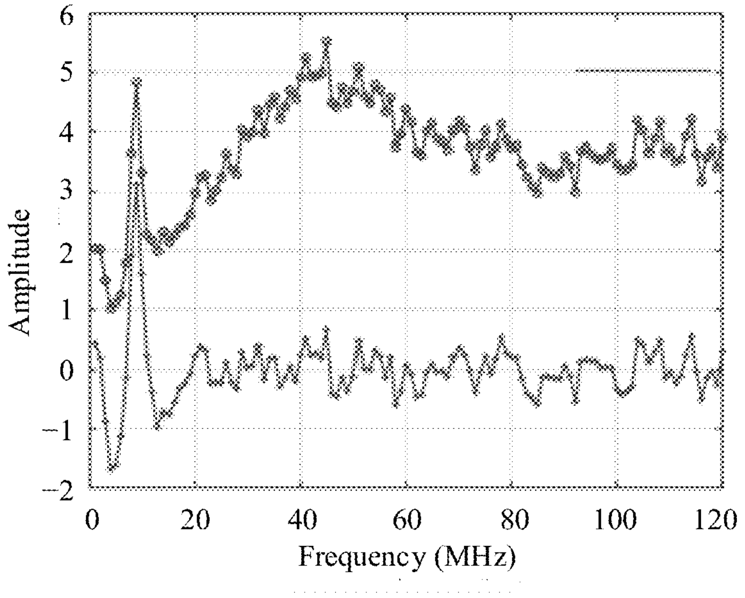
FIG. 10 is a schematic diagram of an effect of low frequency suppression according to an embodiment of the present disclosure.

An upper part of FIG. 10 shows the first signal obtained after FFT is performed. It can be learned that an amplitude of a low frequency part of the first signal is relatively low, because a low frequency suppression operation is performed previously to suppress the amplitude of the low frequency signal.

Figure 11:
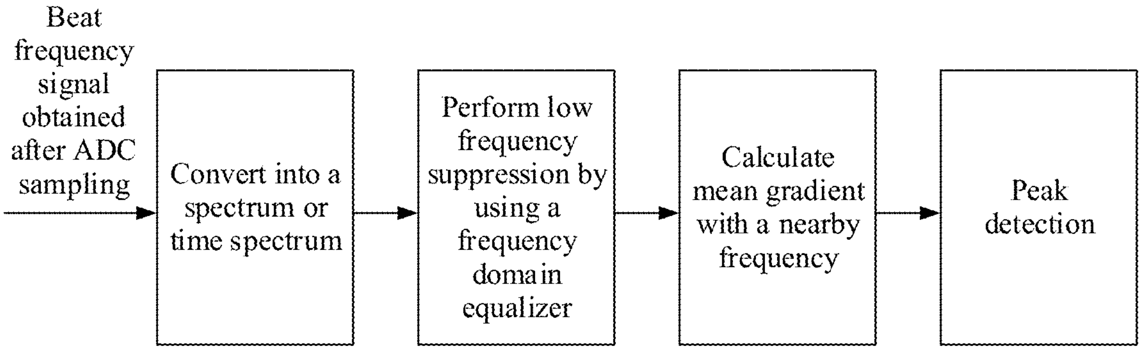
FIG. 11 is a schematic flowchart of another radar detection method according to an embodiment of the present disclosure.

In another manner, as shown in FIG. 11, the obtaining a first signal may specifically include the following operations.

First, FFT or STFT is performed on the beat frequency signal to obtain a second transition signal.

Optionally, the beat frequency signal may be converted into a frequency domain signal by using FFT, and the frequency domain signal is the second transition signal. An expression of the FFT is shown in formula 1-4:

$$S(k)'=F(s(n)) \quad 1\text{-}4$$

In formula 1-4, F( ) represents Fourier transform, and S(k)' is a frequency signal obtained after FFT is performed on the beat frequency signal s(n), that is, the second transition signal described above.

Optionally, the beat frequency signal may be converted into a time-frequency two-dimensional signal by using STFT, and the time-frequency two-dimensional signal is the second transition signal. An expression of the STFT is shown in formula 1-5:

$$S(k)'=\mathrm{STFT}(s(n)) \quad 1\text{-}5$$

In formula 1-5, STFT( ) represents STFT, and S(k)' is a time-frequency two-dimensional spectrum obtained after STFT is performed on the beat frequency signal s(n), that is, the second transition signal described above.

Then, low frequency suppression is performed on the second transition signal to obtain the first signal.

For example, a frequency domain sequence of the second transition signal is multiplied by a preset sequence parameter, which may be specifically implemented by using a frequency domain equalizer. The preset sequence parameter has a relatively low coefficient in a low frequency part and a relatively high coefficient in a high frequency part. In this way, low frequency suppression is completed. For details, refer to formulas 1-6.

$$S(k)=E(n)*S(k)' \quad 1\text{-}6$$

In formula 1-6, S(k) is the first signal, S(k)' is the second transition signal, and E(n) is the preset sequence number parameter.

Step S702: The signal processing apparatus performs mean gradient calculation on the first signal in frequency domain to obtain a second signal.

In an embodiment, after the low frequency suppression, although an interference signal may be suppressed, an amplitude of a low frequency signal may be suppressed severely, thereby causing gain imbalance of an entire frequency band. It can be learned from the upper part of the signal in FIG. 10 that, a signal amplitude in the low frequency part is lower than a signal amplitude in the high frequency part on the whole. This is because energy of the low frequency part is weakened as a whole during the low frequency suppression.

The gain imbalance of the entire frequency band results in a situation that a wave peak originally exists in the low frequency part. However, because low frequency suppression is performed, an amplitude of a wave peak in the low frequency part is lower than an amplitude of a non-wave peak in the high frequency part, that is, a real wave peak is masked. As a result, a subsequent calculation of the speed and/or distance based on the wave peak is inaccurate. To resolve a problem that a real wave peak may be masked, the present disclosure specifically provides a signal optimization manner for calculating a mean gradient. The mean gradient calculation is used to highlight a difference between a signal value of each sampling point in the first signal and a signal value of a surrounding sampling point. A specific principle is as follows: performing, in frequency domain, a target operation on a signal of each sampling point in a plurality of sampling points in the first signal, to obtain a sub-signal that is in the second signal and that corresponds to each sampling point, where the target operation includes: performing a difference operation between a signal value of each sampling point and a reference value to obtain a sub-signal of each sampling point, where the reference value is an average value obtained through calculation based on signal values of at least two other sampling points than the sampling point.

Optionally, in frequency domain, a spacing between the at least two other sampling points and the sampling point is greater than a first preset threshold and less than a second preset threshold. It should be noted that, it is mentioned that the distance is less than the second preset threshold, so that each sampling point is compared with a nearby sampling point for calculation, because if the sampling point is too far from each sampling point, comparison value is lost. However, the another sampling point cannot be too close to each sampling point either, because a sampling point that is too close to each sampling point may have a same problem as that of each sampling point, for example, is severely interfered. Therefore, when the another sampling point is too close to each sampling point, the sub-signal obtained through calculation may be unstable. Therefore, in the present disclosure, the first preset threshold and the second preset threshold are introduced, so that another sampling point used for calculating the sub-signal is near each sampling point, but is not too close.

For ease of understanding, the following provides a method for calculating a sub-signal ΔS(k) of each sampling point as follows:

$$\Delta S(k) = S(k) - \left(\sum_{n=1}^{l_w} (S(k-l_p-n) + S(k+l_p+n))\right) \Big/ (2l_w),$$

where S(k) is a signal value of each sampling point, $S(k-l_p-n)$ is a signal value of another sampling point that has a frequency less than that of each sampling point in frequency domain and that is separated from each sampling point by $(l_p+n)$ sampling points, $S(k+l_p+n)$ is a signal value of another sampling point that has a frequency greater than that of each sampling point in frequency domain and that is separated from each sampling point by $(l_p+n)$ sampling points, $l_p$ is the first preset threshold, and $l_w$ is the second preset threshold.

As shown in FIG. 10, the second signal obtained after mean gradient calculation is performed on the upper part of the signal (that is, the first signal) in FIG. 10 is the lower part of the signal (that is, the second signal) in FIG. 10. It can be learned from the lower part of the signal that even if the low frequency part is suppressed, a wave peak in the low frequency part is highlighted, and a problem that the wave peak in the low frequency part is masked basically does not occur.

Step S703: The signal processing apparatus calculates at least one of a speed or a distance of a target object based on a peak signal in the second signal.

Figure 1:
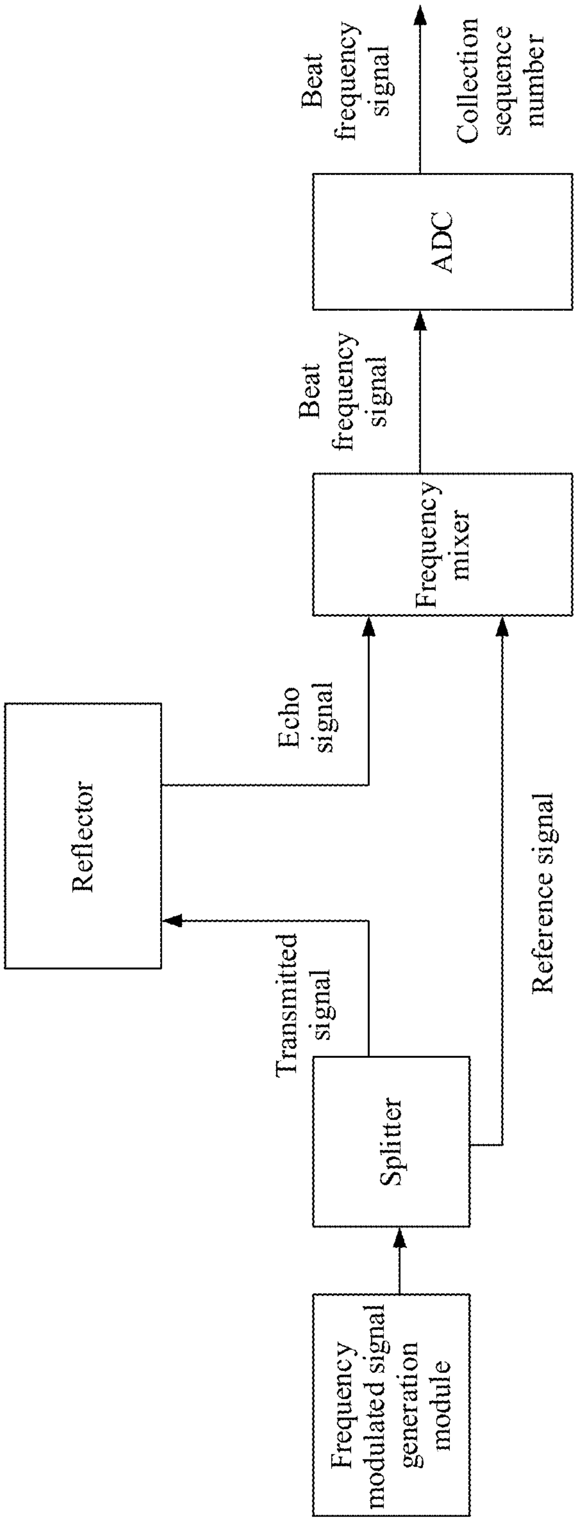
FIG. 1 is a schematic diagram of a principle of a lidar according to an embodiment of the present disclosure.
Figure 2:
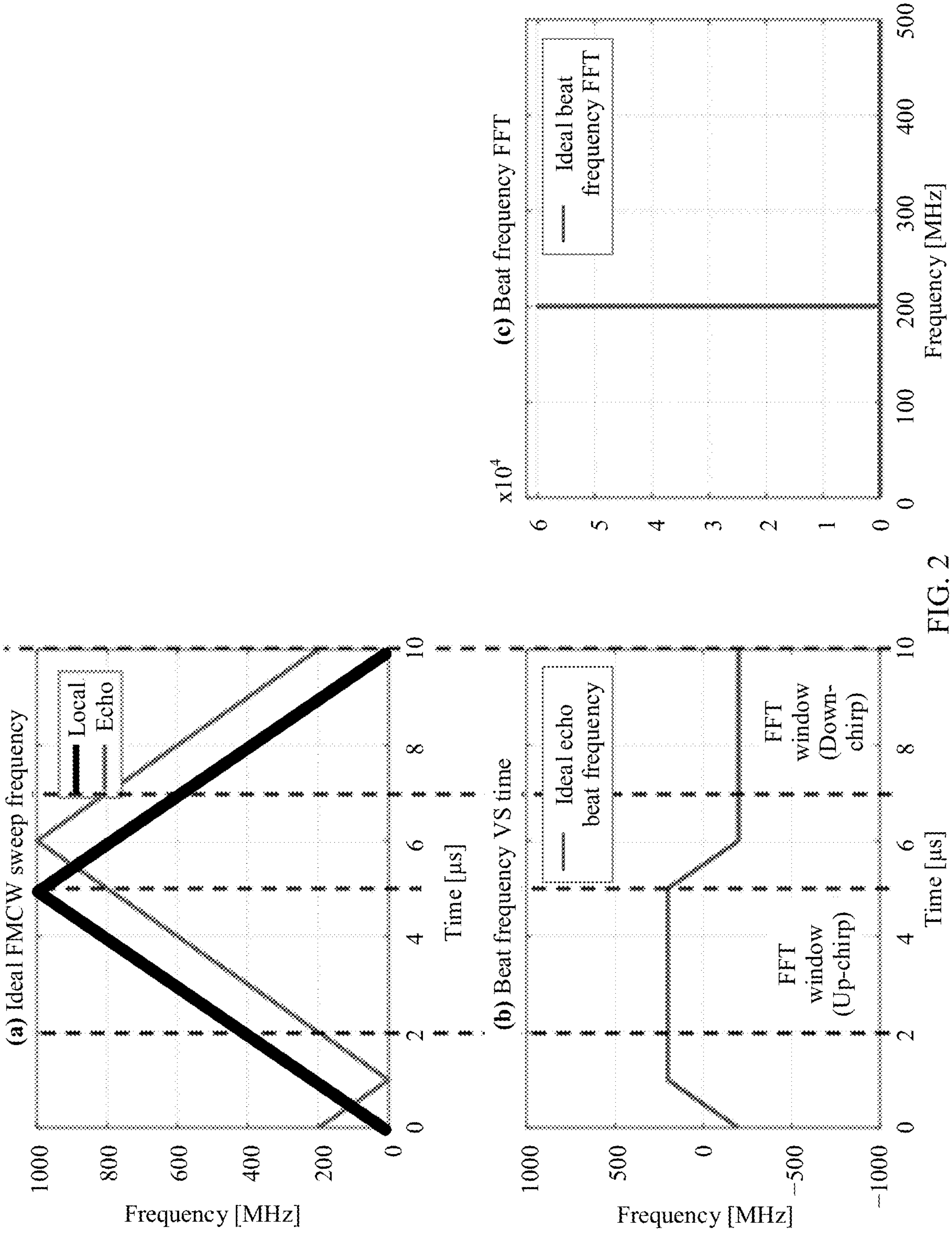
FIG. 2 is a schematic diagram of a beat frequency signal according to an embodiment of the present disclosure.
Figure 3:
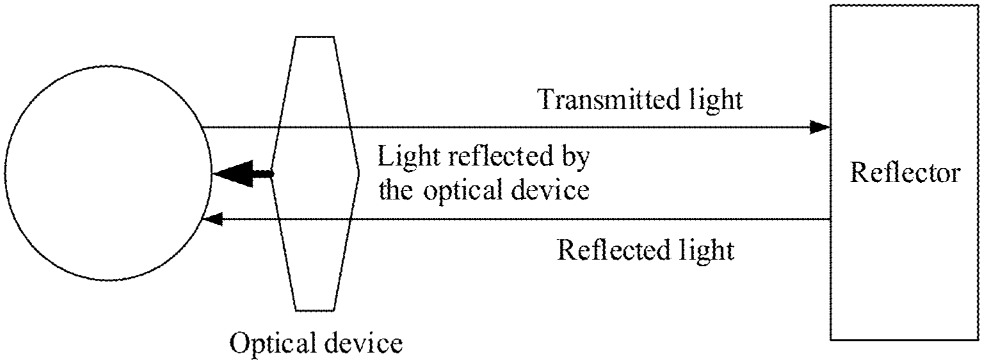
FIG. 3 is a schematic diagram of a scenario in which an optical device generates low frequency interference according to an embodiment of the present disclosure.
Figure 4:
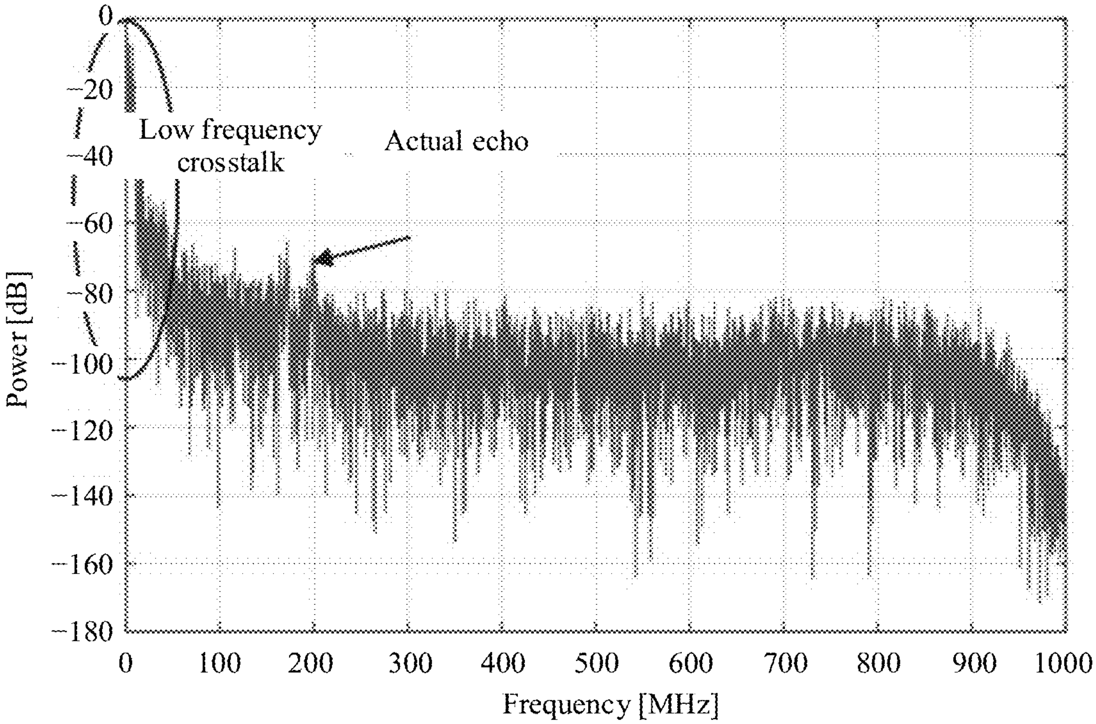
FIG. 4 is a schematic diagram of an effect of low frequency interference according to an embodiment of the present disclosure.

Optionally, as shown in FIG. 2, the transmitted FMCW signal includes an up-chirp (chirp) signal and a down-chirp (chirp) signal. Through the foregoing operations, a peak signal may be obtained respectively from the up-chirp and the down-chirp, frequency positions of the two peak signals are found, and the two found frequency domain positions are respectively $f_u$ and $f_d$. If a recorded frequency modulation slope of the FMCW is α, then:

The distance from the target object to the radar obtained through calculation is $$d = \frac{f_u + f_d}{4\alpha} c,$$

where c is the speed of light.

The moving speed of the target object obtained through calculation is $$v = \left(\frac{f_u - f_d}{2}\right)\lambda,$$

where λ is the wavelength of the emitted laser.

In the method described in FIG. 7, low frequency suppression is performed on the frequency domain signal of the beat frequency signal, so as to reduce influence of low frequency interference on subsequent calculation of the speed or distance of the target object. To prevent a peak signal that may exist in the low frequency part from being clipped due to low frequency suppression, the peak signal that may exist in the low frequency part is further highlighted by performing mean gradient calculation. Therefore, accuracy of a radar detection result calculated by using the solution in this embodiment of the present disclosure is relatively high. In addition, implementation of this embodiment of the present disclosure is completed by performing special processing on a signal, and a hardware structure of a radar does not need to be improved. Therefore, implementation costs are relatively low.

The foregoing describes in detail the method in embodiments of the present disclosure. The following provides an apparatus in embodiments of the present disclosure.

Figure 12:
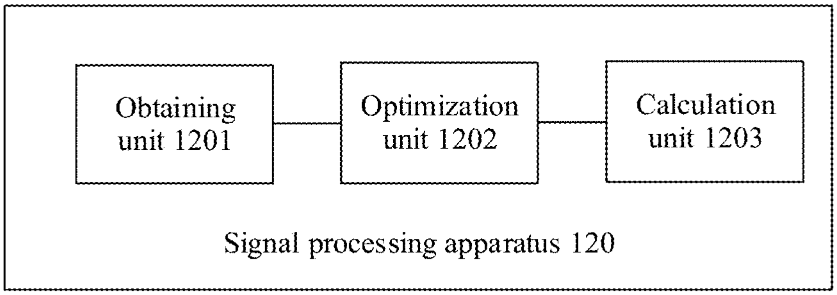
FIG. 12 is a schematic diagram of a structure of a signal processing apparatus according to an embodiment of the present disclosure.

FIG. 12 is a schematic diagram of a structure of a signal processing apparatus 120 according to an embodiment of the present disclosure. The apparatus 120 may be the foregoing lidar system, or a processor in the lidar system, or a related component on which the processor is deployed and deployed in the laser radar system. The signal processing apparatus 120 may include an obtaining unit 1201, an optimization unit 1202, and a calculation unit 1203. Detailed descriptions of the units are as follows: the obtaining unit 1201 is configured to obtain a first signal, where the first signal is a frequency domain signal obtained after low frequency suppression is performed in a beat frequency signal, and the beat frequency signal is a signal obtained by mixing a transmitted signal transmitted by a frequency modulated continuous wave FMCW radar and a received echo signal; the optimization unit 1202 is configured to perform mean gradient calculation on the first signal in frequency domain to obtain a second signal, where the mean gradient calculation is used to highlight a difference between a signal value of each sampling point in the first signal and a signal value of a surrounding sampling point; and the calculation unit 1203 is configured to calculate at least one of a speed or a distance of a target object based on a peak signal in the second signal.

In this solution, low frequency suppression is performed on the frequency domain signal of the beat frequency signal, so as to reduce influence of low frequency interference on subsequent calculation of the speed or distance of the target object. To prevent a peak signal that may exist in the low frequency part from being clipped due to low frequency suppression, the peak signal that may exist in the low frequency part is further highlighted by performing mean gradient calculation. Therefore, accuracy of a radar detection result calculated by using the solution in this embodiment of the present disclosure is relatively high. In addition, implementation of this embodiment of the present disclosure is completed by performing special processing on a signal, and a hardware structure of a radar does not need to be improved. Therefore, implementation costs are relatively low.

In an optional solution, in terms of obtaining the first signal, the obtaining unit 1201 is further configured to:

perform low frequency suppression on the beat frequency signal to obtain a first transition signal; and perform FFT or STFT on the first transition signal to obtain the first signal.

In an optional solution, in terms of obtaining the first signal, the obtaining unit 1201 is further configured to: perform FFT or STFT on the beat frequency signal to obtain a second transition signal; and perform low frequency suppression on the second transition signal to obtain the first signal.

In still another optional solution, the low frequency suppression is implemented by using a digital tap filter, or the low frequency suppression is implemented by performing scaling processing on a preset sequence parameter.

In still another optional solution, when mean gradient calculation is performed on the first signal in frequency domain to obtain a second signal, the calculation unit 1203 is further configured to: perform, in frequency domain, a target operation on a signal of each sampling point in a plurality of sampling points in the first signal, to obtain a sub-signal that is in the second signal and that corresponds to each sampling point, where the target operation includes: performing a difference operation between a signal value of each sampling point and a reference value to obtain a sub-signal of each sampling point, where the reference value is an average value obtained through calculation based on signal values of at least two other sampling points than the sampling point.

In still another optional solution, in frequency domain, a spacing between the at least two other sampling points and the sampling point is greater than a first preset threshold and less than a second preset threshold.

In still another optional solution, a sub-signal ΔS(k) of each sampling point is as follows:

$$\Delta S(k) = S(k) - \left(\sum_{n=1}^{l_w} (S(k - l_p - n) + S(k + l_p + n))\right) \Big/ (2l_w),$$

where S(k) is a signal value of each sampling point, $S(k-l_p-n)$ is a signal value of another sampling point that has a frequency less than that of each sampling point in frequency domain and that is separated from each sampling point by $(l_p+n)$ sampling points, $S(k+l_p+n)$ is a signal value of another sampling point that has a frequency greater than that of each sampling point in frequency domain and that is separated from each sampling point by $(l_p+n)$ sampling points, $l_p$ is the first preset threshold, and $l_w$ is the second preset threshold.

It should be noted that, for implementations of the units, reference may be correspondingly made to corresponding descriptions of the method embodiment shown in FIG. 7. The foregoing units may be implemented by software, hardware, or a combination thereof. The hardware may be the foregoing processor, and the software may include driver code running on the processor. This is not limited in this embodiment.

An embodiment of the present disclosure further provides a chip system. The chip system includes at least one processor, a memory, and an interface circuit. The memory, the interface circuit, and the at least one processor are interconnected through lines, and the at least one memory stores instructions. When the instructions are executed by the processor, the method procedure shown in FIG. 7 is implemented.

An embodiment of the present disclosure further provides a computer-readable storage medium. The computer-readable storage medium stores instructions, and when the instructions are run on a processor, the method procedure shown in FIG. 7 is implemented.

An embodiment of the present disclosure further provides a computer program product. When the computer program product is run on a processor, the method procedure shown in FIG. 7 is implemented.

In conclusion, low frequency suppression is performed on the frequency domain signal of the beat frequency signal, so as to reduce influence of low frequency interference on subsequent calculation of the speed or distance of the target object. To prevent a peak signal that may exist in the low frequency part from being clipped due to low frequency suppression, the peak signal that may exist in the low frequency part is further highlighted by performing mean gradient calculation. Therefore, accuracy of a radar detection result calculated by using the solution in this embodiment of the present disclosure is relatively high. In addition, implementation of this embodiment of the present disclosure is completed by performing special processing on a signal, and a hardware structure of a radar does not need to be improved. Therefore, implementation costs are relatively low.

A person of ordinary skill in the art may understand that all or some of the processes of the methods in the embodiments may be implemented by a computer program instructing relevant hardware. The program may be stored in a computer-readable storage medium. When the program is executed, the processes of the methods in the embodiments are performed. The foregoing storage medium includes various media that can store program code, such as a ROM or a RAM, a magnetic disk, or an optical disc.

What is claimed is:

1. A method comprising:

receiving an echo signal;

mixing a signal from a frequency modulated continuous wave (FMCW) radar and the echo signal to obtain a beat frequency signal;

performing low frequency suppression on the beat frequency signal to obtain a first signal;

performing, in a frequency domain, a mean gradient calculation on amplitude values of frequency bins of the first signal to obtain a second signal, wherein the mean gradient calculation indicates a difference between a first signal value of each sampling point in the first signal and a second signal value of a surrounding sampling point to unmask one or more wave peaks that may have been masked by performing the low frequency suppression;

determining a peak signal in the second signal; and calculating at least one of a speed or a distance of a target object based on the peak signal.

2. The method of claim 1, wherein performing low frequency suppression on the beat frequency signal to obtain the first signal comprises:

performing low frequency suppression on the beat frequency signal to obtain a first transition signal; and performing a discrete Fourier transform or a short-time Fourier transform on the first transition signal to obtain the first signal.

3. The method of claim 1, wherein performing low frequency suppression on the beat frequency signal to obtain the first signal comprises:

performing a discrete Fourier transform or a short-time Fourier transform on the beat frequency signal to obtain a second transition signal; and performing low frequency suppression on the second transition signal to obtain the first signal.

4. The method of claim 1, further comprising performing the low frequency suppression using a digital tap filter, or performing the low frequency suppression by performing scaling processing on a preset sequence parameter.

5. The method of claim 1, wherein performing the mean gradient calculation on the first signal in the frequency domain to obtain the second signal comprises performing, in the frequency domain, a target operation on a third signal of each sampling point in a plurality of sampling points in the first signal to obtain a sub-signal of each sampling point that is in the second signal and that corresponds to each of the sampling point, wherein the target operation comprises performing a difference operation between the first signal value of each sampling point and a reference value to obtain the sub-signal, and wherein the reference value is an average value based on signal values of at least two other sampling points different from the sampling point.

6. The method of claim 5, wherein in the frequency domain, a spacing between the at least two other sampling points and the sampling point is greater than a first preset threshold and less than a second preset threshold.

7. The method of claim 6, wherein the sub-signal, represented as $\Delta S(k)$, of each sampling point is as follows:

$$\Delta S(k) = S(k) - \left(\sum_{n=1}^{l_w} (S(k - l_p - n) + S(k + l_p + n))\right) \Big/ (2l_w),$$

wherein $S(k)$ is the first signal value of each sampling point, $S(k-l_p-n)$ is a third signal value of another sampling point that has a first frequency less than that of each sampling point in the frequency domain and that is separated from each sampling point by $(l_p+n)$ sampling points, $S(k+l_p+n)$ is a fourth signal value of another sampling point that has a second frequency greater than that of each sampling point in the frequency domain and that is separated from each sampling point by $(l_p+n)$ sampling points, $l_p$ is the first preset threshold, and $l_w$ is the second preset threshold.

8. An apparatus comprising:

a memory configured to store instructions; and a processor coupled to the memory and configured to execute the instructions to cause the apparatus to:

receive an echo signal;

mix a signal from a frequency modulated continuous wave (FMCW) radar and the echo signal to obtain a beat frequency signal;

perform low frequency suppression on the beat frequency signal to obtain a first signal;

perform, in a frequency domain, a mean gradient calculation on amplitude values of frequency bins of the first signal to obtain a second signal, wherein the mean gradient calculation indicates a difference between a first signal value of each sampling point in the first signal and a second signal value of a surrounding sampling point to unmask one or more wave peaks that may have been masked by performing the low frequency suppression;

determine a peak signal in the second signal; and calculate at least one of a speed or a distance of a target object based on the peak signal.

9. The apparatus of claim 8, wherein performing low frequency suppression on the beat frequency signal to obtain the first signal comprises:

performing low frequency suppression on the beat frequency signal to obtain a first transition signal; and performing a discrete a-Fourier transform or a short-time Fourier transform on the first transition signal to obtain the first signal.

10. The apparatus of claim 8, wherein performing low frequency suppression on the beat frequency signal to obtain the first signal comprises:

performing a discrete a-Fourier transform or a short-time Fourier transform on the beat frequency signal to obtain a second transition signal; and performing low frequency suppression on the second transition signal to obtain the first signal.

11. The apparatus of claim 8, further configured to perform the low frequency suppression using a digital tap filter, or perform the low frequency suppression by performing scaling processing on a preset sequence parameter.

12. The apparatus of claim 8, wherein performing the mean gradient calculation on the first signal in the frequency domain to obtain the second signal comprises performing, in the frequency domain, a target operation on a third signal of each sampling point in a plurality of sampling points in the first signal to obtain a sub-signal of each sampling point that is in the second signal and that corresponds to each of the sampling point, wherein the target operation comprises performing a difference operation between the first signal value of each sampling point and a reference value to obtain the sub-signal, and wherein the reference value is an average value based on signal values of at least two other sampling points different from the sampling point.

13. The apparatus of claim 12, wherein in the frequency domain, a spacing between the at least two other sampling points and the sampling point is greater than a first preset threshold and less than a second preset threshold.

14. The apparatus of claim 13, wherein the sub-signal, represented as ΔS(k), of each sampling point is as follows:

$$\Delta S(k) = S(k) - \left(\sum_{n=1}^{l_w} (S(k - l_p - n) + S(k + l_p + n))\right) \Big/ (2l_w),$$

wherein S(k) is the first signal value of each sampling point, $S(k-l_p-n)$ is a third signal value of another sampling point that has a first frequency less than that of each sampling point in the frequency domain and that is separated from each sampling point by $(l_p+n)$ sampling points, $S(k+l_p+n)$ is a fourth signal value of another sampling point that has a second frequency greater than that of each sampling point in the frequency domain and that is separated from each sampling point by $(l_p+n)$ sampling points, $l_p$ is the first preset threshold, and $l_w$ is the second preset threshold.

15. A computer program product comprising computer-executable instructions stored on a non-transitory computer-readable storage medium, wherein the computer-executable instructions, when executed by a processor of an apparatus, cause the apparatus to:

receive an echo signal;

mix a signal from a frequency modulated continuous wave (FMCW) radar and the echo signal to obtain a beat frequency signal;

perform low frequency suppression on the beat frequency signal to obtain a first signal;

perform, in a frequency domain, a mean gradient calculation on amplitude values of frequency bins of the first signal to obtain a second signal, wherein the mean gradient calculation indicates a difference between a first signal value of each sampling point in the first signal and a second signal value of a surrounding sampling point to unmask one or more wave peaks that may have been masked by performing the low frequency suppression;

determine a peak signal in the second signal; and calculate at least one of a speed or a distance of a target object based on the peak signal.

16. The computer program product of claim 15, wherein performing low frequency suppression on the beat frequency signal to obtain the first signal comprises:

performing low frequency suppression on the beat frequency signal to obtain a first transition signal; and performing a discrete Fourier transform or a short-time Fourier transform on the first transition signal to obtain the first signal.

17. The computer program product of claim 15, wherein performing low frequency suppression on the beat frequency signal to obtain the first signal comprises:

performing a discrete Fourier transform or a short-time Fourier transform on the beat frequency signal to obtain a second transition signal; and performing low frequency suppression on the second transition signal to obtain the first signal.

18. The computer program product of claim 15, further configured to perform the low frequency suppression using a digital tap filter, or perform the low frequency suppression by performing scaling processing on a preset sequence parameter.

19. The computer program product of claim 15, wherein performing the mean gradient calculation on the first signal in the frequency domain to obtain the second signal comprises performing, in the frequency domain, a target operation on a third signal of each sampling point in a plurality of sampling points in the first signal to obtain a sub-signal of each sampling point that is in the second signal and that corresponds to each sampling point, wherein the target operation comprises performing a difference operation between the first signal value of each sampling point and a reference value to obtain the sub-signal, and wherein the reference value is an average value based on signal values of at least two other sampling points than the sampling point.

20. The computer program product of claim 19, wherein in the frequency domain, a spacing between the at least two other sampling points and the sampling point is greater than a first preset threshold and less than a second preset threshold.

* * * * *